United States Patent
Han et al.

(10) Patent No.: US 11,985,569 B2
(45) Date of Patent: May 14, 2024

(54) IDENTIFYING PROBLEMATIC 2D POSITIONS FROM MOBILE DEVICES

(71) Applicant: NextNav, LLC, Sunnyvale, CA (US)

(72) Inventors: Guiyuan Han, San Jose, CA (US); Michael Dormody, San Jose, CA (US); Badrinath Nagarajan, South San Francisco, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 161 days.

(21) Appl. No.: 17/452,862

(22) Filed: Oct. 29, 2021

(65) Prior Publication Data
US 2023/0138050 A1   May 4, 2023

(51) Int. Cl.
*H04W 4/029* (2018.01)
*G01C 5/06* (2006.01)
*H04W 4/02* (2018.01)

(52) U.S. Cl.
CPC ............ *H04W 4/029* (2018.02); *G01C 5/06* (2013.01); *H04W 4/027* (2013.01)

(58) Field of Classification Search
CPC ........ H04W 4/029; H04W 4/027; G01C 5/06; G01S 5/017; G01S 5/018; G01S 5/02585; G01S 5/0269; G01S 19/396; G01S 5/012; G01S 5/0244

See application file for complete search history.

(56) References Cited

U.S. PATENT DOCUMENTS

| | | | |
|---|---|---|---|
| 2008/0167049 A1* | 7/2008 | Karr | G01S 5/0278 455/456.2 |
| 2012/0182180 A1* | 7/2012 | Wolf | G01S 5/14 342/357.29 |
| 2014/0149060 A1 | 5/2014 | Meduna et al. | |

(Continued)

FOREIGN PATENT DOCUMENTS

EP          3663787 A1 *  6/2020

OTHER PUBLICATIONS

Form PCT/ISA/206, PCT/US2020/032526, "Invitation to Pay Addition Fees and, Where Applicable, Protest Fee", 4 page(s); EPO Form P04A42, PCT/US2020/032526, "Information on Search Strategy", 1 page(s); EPO Form 1707, PCT/US2020/032526, "Provisional Opinion", 8 page(s); dated Aug. 19, 2020.

(Continued)

*Primary Examiner* — Umair Ahsan
(74) *Attorney, Agent, or Firm* — MLO, a professional corp.

(57) ABSTRACT

A method to identify a problematic 2D position of a mobile device can include: determining a reported 2D position of the mobile device; determining a piece of information about the mobile device; and comparing the reported 2D position and the piece of information about the mobile device. Upon determining that the reported 2D position and the piece of information about the mobile device are consistent with each other, the reported 2D position of the mobile device is used as an estimate of the actual 2D position of the mobile device, or upon determining that the reported 2D position and the piece of information about the mobile device are not consistent with each other, the reported 2D position is determined to be problematic, and the reported 2D position of the mobile device is removed from a list of reported 2D positions of the mobile device.

14 Claims, 8 Drawing Sheets

(56) References Cited

U.S. PATENT DOCUMENTS

| | | |
|---|---|---|
| 2015/0087264 A1 | 3/2015 | Goyal |
| 2016/0205238 A1 | 7/2016 | Abramson et al. |
| 2016/0245716 A1 | 8/2016 | Gum et al. |
| 2017/0276483 A1 | 9/2017 | Dormody et al. |
| 2018/0087909 A1 | 3/2018 | Do et al. |
| 2018/0094998 A1 | 4/2018 | Youssef et al. |
| 2018/0114133 A1 | 4/2018 | Chowdhary et al. |

OTHER PUBLICATIONS

International Search Report dated Oct. 12, 2020 for PCT Patent Application No. PCT/US20/32526.
Notice of Allowance dated Mar. 22, 2021 for U.S. Appl. No. 15/930,289.
Office Action dated Dec. 2, 2020 for U.S. Appl. No. 15/930,289.
Sankaran, et al., Using Mobile Phone Barometer for Low-Power Transportation Context Detection, Nov. 2014, 15 pgs, ACM, Memphis, TN.
International Search Report and Written Opinion dated Jan. 25, 2023 for PCT Patent Application No. PCT/IB2022/059833.

* cited by examiner

IDENTIFYING PROBLEMATIC 2D POSITIONS FROM MOBILE DEVICES

BACKGROUND

A reported 2D position (e.g., latitude and longitude) of a mobile device can be generated using a global navigation satellite system (GNSS), a WIFI™ network based location generation system (e.g., WIFI beacon systems), a cell phone network based location generation system (e.g., network-based location, trilateration, multilateration, etc.), or another location generation system.

However, determining the exact position of a mobile device (e.g., a smart phone operated by a user) in an environment can be quite challenging, especially when the mobile device is located in an urban environment or is located within a building. Imprecise estimates of the mobile device's position may have "life or death" consequences for the user of the mobile device since an imprecise estimate of a mobile device's position can delay emergency personnel response times. In less dire situations, imprecise estimates of a mobile device's position can negatively impact navigation applications by sending a user of the mobile device to an incorrect location in an environment.

SUMMARY

In some embodiments, a method includes: determining, using a processor of a mobile device, a first reported 2D position of the mobile device reported at a first time; determining, using the processor of the mobile device, a first piece of information about the mobile device; and comparing, using the processor of the mobile device, the first reported 2D position and the first piece of information about the mobile device. Upon determining that the first reported 2D position and the first piece of information about the mobile device are consistent with each other, using the first reported 2D position of the mobile device, by the processor of the mobile device, as an estimate of the actual 2D position of the mobile device. Upon determining that the first reported 2D position and the first piece of information about the mobile device are not consistent with each other, determining, using the processor of the mobile device, that the first reported 2D position is problematic, and removing, using the processor of the mobile device, the first reported 2D position of the mobile device from a list of reported 2D positions of the mobile device.

In some embodiments, a method includes: determining, using a processor of a mobile device, a first reported 2D position of the mobile device reported at a first time and a second reported 2D position of the mobile device reported at a second time; determining, using the processor of the mobile device, a first piece of information about the mobile device using the first reported 2D position of the mobile device reported at the first time and the second reported 2D position of the mobile device reported at the second time; and comparing, using the processor of the mobile device, the first reported 2D position and the first piece of information about the mobile device. Upon determining that the first reported 2D position and the first piece of information about the mobile device are consistent with each other, using the first reported 2D position of the mobile device, by the processor of the mobile device, as an estimate of the actual 2D position of the mobile device. Upon determining that one or both of the first reported 2D position and the first piece of information about the mobile device are not consistent with each other, and that the second reported 2D position and the first piece of information about the mobile device are not consistent with each other; determining that the first reported 2D position is problematic, or that the second reported 2D position is problematic, or that the first and the second reported 2D positions are problematic; and removing, using the processor of the mobile device, the first reported 2D position, or the second reported 2D position, or both the first and the second reported 2D positions of the mobile device from a list of reported 2D positions of the mobile device.

DETAILED DESCRIPTION

Figure 1A:
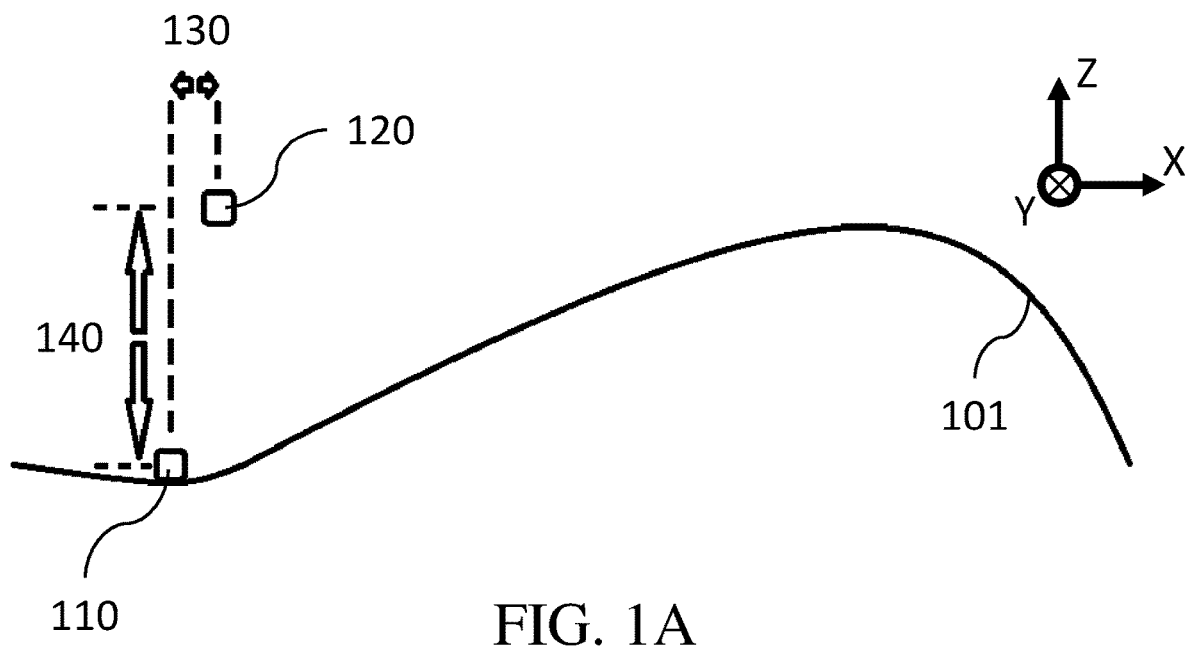
FIGS. 1A and 1B show simplified schematics of an example of a mobile device at different positions at different times over a terrain, in accordance with some embodiments.

Systems and methods to identify a problematic 2D position (i.e., 2D location) of a mobile device are described herein. 2D positions can be used in an altitude determination system of the mobile device, or in other applications that require detection of the mobile device location, such as a latitude and a longitude of the mobile device. Once identified, a problematic 2D position can be removed from the position dataset of the mobile device in order to improve the performance of the system or application relying on the location information.

Removing (or filtering, or deleting, or discarding) potentially problematic 2D positions can improve the functionality of the mobile device by enabling the mobile device to produce more accurate position estimates thereof, which can provide a positive economic impact (e.g., enabling more accurate advertising), improved navigation, and assistance to first responders.

In some cases, methods to identify problematic 2D positions may include (1) checking other information that is provided by the device, such as device altitude, device (or handset) pressure, accelerometer, and activity context; (2) checking consistency of device information, such as the moving speed of the mobile device; and (3) checking against another available database, such as a building footprint shape file, a building height database, and the height of terrain according to 2D position information. Systems to identify problematic 2D positions may include systems configured to perform one or more of the above methods.

The location or position (e.g., latitude and longitude) information returned by a mobile device of a user is often used to determine the 2D position of the mobile device (and a user of the mobile device). A reported 2D position (e.g., latitude and longitude) of a mobile device can be generated using any available position estimation method on the mobile device, such as, a global navigation satellite system (GNSS), a terrestrial positioning system (for example, a wide area positioning system (WAPS)), a WIFI™ network-based location generation system, BLUETOOTH® beacons, or a cellular network-based location generation system. However, for various reasons, the latitude and longitude of the devices could be stale or inaccurate, and not reflect the actual (or correct, or true) position of the device (and/or user). Such problematic (or incorrect) location information could impact the overall performance of systems that determine and/or use altitude (e.g., height above ellipsoid (HAE)) calculations, relative altitude (e.g., height above terrain (HAT)) determinations and/or device (and/or user) floor estimations, and/or device sensor calibration. For example, a problematic 2D location could cause a process to use inaccurate pressure and temperature references and, therefore, generate altitude (e.g., HAE) values of a mobile device incorrectly. 2D location information can be used in the mapping from HAE to HAT and the mapping from HAE to floor level in a building, and therefore incorrect 2D location information can impact the accuracy of the HAT determination and/or floor estimation of a mobile device. Incorrect 2D location information can also affect the terrain and/or floor truth value used in a calibration of one or more sensors (e.g., altitude and/or pressure sensors) of the device.

Certain aspects disclosed herein relate to estimating the positions of mobile devices, for example, where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by the speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude, and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015, incorporated by reference herein in its entirety for all purposes. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

In some cases, the detection of one or more problematic 2D positions of a mobile device can be used to improve a pressure-based altitude determination system of a mobile device. For example, the determination of a problematic (or an incorrect) latitude and longitude can enable the system to avoid determining an incorrect pressure and temperature reference, an incorrect terrain value used in sensor calibration, and/or an incorrect terrain value used in mapping from height above ellipsoid (HAE) to height above terrain (HAT) and floor level. Additionally, in some cases, upon determining that a 2D position of the mobile device is stale and/or problematic and/or incorrect, the system can remove (or filter, or delete, or discard) the stale and/or problematic and/or incorrect 2D position from a list of reported 2D positions. In some cases, upon determining that a 2D position of the mobile device is stale and/or problematic and/or incorrect, the system can flag (or mark) the 2D position, for example, to be excluded from use in other operations (e.g., a determination of an estimate of the actual 2D position of the mobile device, a calibration of a component of the mobile device, or another operation).

Determining a Problematic 2D Position of a Mobile Device Using Other Information from the Mobile Device In some cases, a problematic 2D position of a mobile device can be determined using other information from the mobile device (e.g., measured using one or more sensors of the mobile device).

In some cases, a problematic 2D position of a mobile device can be determined using altitude and/or pressure information from the device. An estimate of the altitude of the mobile device can be made using an altitude sensor of the device (e.g., an altimeter), or a pressure sensor of the device in conjunction with a barometric-altitude equation to relate the measured pressure to an altitude. Additionally, in some cases, an estimate of the altitude of the mobile device can be derived from any available position estimation method on the mobile device, such as, GNSS, a terrestrial positioning system (e.g., WAPS), a BLUETOOTH® beacon, or by another system (e.g., a cellular network-based location generation system) that is in communication with the mobile device. The measurement and determination of the altitude and/or pressure experienced by a mobile device is described in U.S. Pat. No. 11,073,441, issued on Jul. 27, 2021, and entitled "Systems and Methods for Determining When to Calibrate a Pressure Sensor of a Mobile Device," which is owned by the present assignee and is hereby incorporated by reference in its entirety.

In an example, the 2D information from the mobile device indicates that the mobile device is outdoors (i.e., the mobile device is reported to be outdoors). A measurement of the altitude can be made using a sensor of the mobile device (e.g., an altitude sensor and/or a pressure sensor of the device). In such cases, the altitude of the device can be directly related to the height of terrain at the device's location. For example, the altitude of the device (or handset altitude) can be assumed to be about a meter higher than the height of the local terrain surface. This is typically a good assumption because most users (e.g., pedestrian users) carry their mobile devices (e.g., phones) in a clothes pocket, a handbag, or a backpack. In this example, if the altitude of the device between two points in time changes significantly (e.g., by more than 1 m, or more than 2 m, or more than 3 m) and the 2D position information of the device does not change significantly (e.g., by less and 1 m, or less than 2 m, or less than 3 m) between the two points in time, then a determination can be made that the 2D position information at one or both points in time is problematic. For example, two reported 2D locations from the device are determined that are separated in time and have nearly the same position (or latitude and longitude) (e.g., the distance between two positions is only about 1 m, or is less than 1 m), but information from the device indicates (or estimates) that the device altitude has changed by more than a certain threshold (e.g., more than 3 m), then the 2D information of the device can be determined to be (or be flagged as) stale and/or problematic and/or incorrect. Alternatively, if a pressure measured by the device changes in a certain time period by more than a certain threshold (e.g., a threshold greater than 10 Pa, or greater than 30 Pa, or greater than 50 Pa) while ambient pressure (e.g., determined using a reference pressure network) does not change by a similar amount (e.g., does not change by more than 10 Pa, or more than 30 Pa, or more than 50 Pa) in a short time (e.g., within 5 to 10 mins), then 2D information of device may be determined to be (or be flagged as) stale and/or problematic and/or incorrect.

In some cases, the above method does not require information from a reference network to be sent to the device or server for calculation. In other cases, the above method can be done with a reference network (e.g., a reference pressure network). If a reference pressure network is available, then the pressure threshold (e.g., the threshold for the amount that the pressure measured by the device can change over a certain time period) could be tightened since the reference pressure network can be used as a baseline of the ambient pressure change in that time interval in the comparison. In cases where a reference pressure network is not available, then the pressure threshold can be determined by a maximum expected ambient pressure change in that time interval.

Figure 1B:
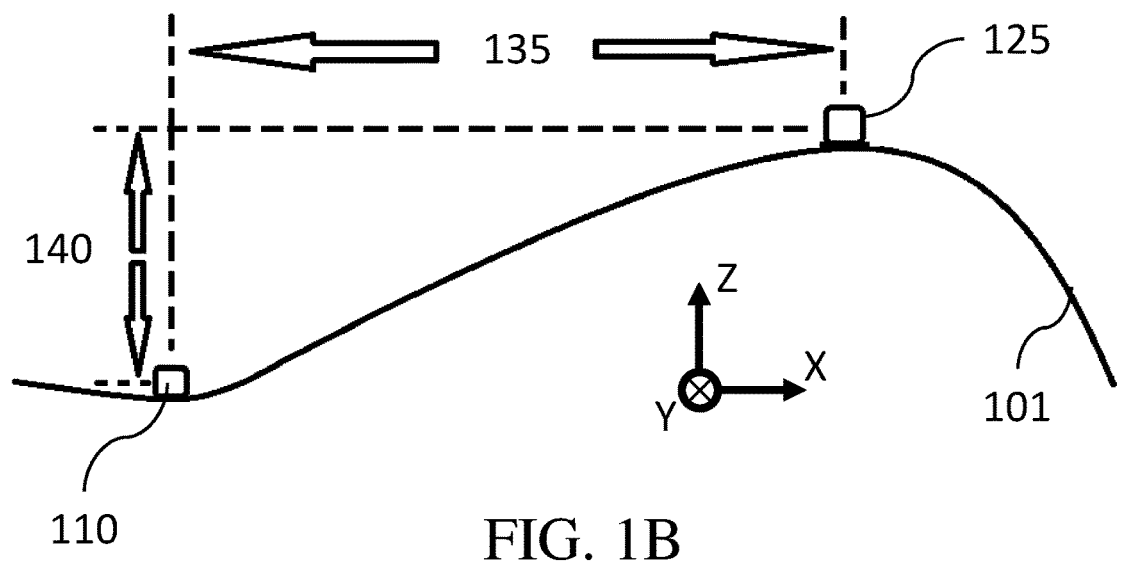

FIGS. 1A and 1B show simplified schematics of an example of a mobile device at different positions at different times over a terrain 101. In this example, an altitude measured by the device (e.g., measured using an altimeter, or other type of altitude sensor, of the mobile device) is used to determine if a reported 2D position may be stale and/or problematic and/or incorrect. FIG. 1 shows a reported position 110 of a mobile device at a first instant in time (time 0) and a reported position 120 of the same mobile device at a second instant in time (time 1). At time 0 the device reports that it has a reported 2D position with coordinates (X0,Y0) and an altitude of Z0, and the coordinates of the reported position 110 are (X0,Y0,Z0). The directions X, Y and Z are shown in FIGS. 1A and 1, and direction Y points into the page. At time 1 the device reports that it has a reported 2D position with coordinates (X1,Y1) and an altitude of Z1, and the coordinates of the reported position 120 are (X1,Y1,Z1). The horizontal distance 130 between the reported positions 110 and 120 (reported at time 0 and time 1, respectively) is very close (e.g., less than 1 m, or less than 2 m, or less than 3 m). However, the device altitude difference 140 between the reported positions 110 and 120 has changed more than a threshold amount (e.g., a threshold of greater than 1 m, or a threshold of greater than 2 m, or a threshold of greater than 3 m) from altitude Z0 to altitude Z1, which indicates the reported 2D location (X1,Y1) at time 1 is likely stale, problematic, and/or incorrect. Therefore, in this case, the system can determine that the reported 2D location (X1,Y1) at time 1 may be stale, problematic, and/or incorrect. FIG. 1B shows a possible correct (or actual) position 125 of the mobile device at time 1, with a possible actual 2D position with coordinates (X2,Y2) and an altitude of Z1. Therefore, the actual position 125 of the device at time 1 could have the coordinates (X2,Y2,Z1).

Alternatively, pressure measurements (e.g., made using a pressure sensor of the mobile device) from the device at time 0 and at time 1 can be used instead of (or in addition to) altitude measurements from the device. For example, as described above, the horizontal distance between the reported positions 110 and 120 of the device (at time 0 and time 1, respectively) can be similar (e.g., where the distance 130 between reported device locations is very close, or is less than 1 m), but the difference in measured device pressure from time 0 to time 1 can change significantly (e.g., by more than 10 Pa, or by more than 30 Pa). Since the pressure change can be indicative of the device changing altitude, for similar reasons as described in the example above, the system can determine that the reported 2D location at time 1 is likely stale, problematic, and/or incorrect. As shown in FIG. 1B, the actual position 125 of the mobile device at time 1 could be at the 2D location (X2,Y2) and an altitude Z1 that is consistent with the pressure measurement.

In some cases of the methods described with respect to FIGS. 1A and 1B (e.g., method 700 in FIG. 7A), the system can determine that the reported 2D location at time 1 is likely stale, problematic, and/or incorrect and in response remove (or filter, or delete, or discard) the reported 2D location at time 1 from a list of reported 2D positions of the mobile device. In some cases of this example, upon determining that a 2D position of the mobile device is stale and/or problematic and/or incorrect, a system of the mobile device (and/or external systems) can flag (or mark) the 2D position, for example, to be excluded from use in other operations (e.g., a determination of an estimate of the actual 2D position of the mobile device, a calibration of a component of the mobile device, or another operation). In some cases of this example, upon determining that a 2D position of the mobile device is stale and/or problematic and/or incorrect, a system of the mobile device (and/or external systems) can re-trigger a location determination routine or use a different method to determine an estimate of the actual 2D position of the device.

In some cases, a problematic 2D position of a mobile device can be determined using acceleration and/or activity context information from the device.

Activity context is the likely activity the user of the mobile device is performing (e.g., still, walking, or driving). In some cases, activity context can be determined using sensor data from the device. Different types of information can be collected by a mobile device for use in determining an activity context of that mobile device. For example, vector movement indicative of particular movement—e.g., walking, driving, remaining still, falling, moving up or down on a vertical axis, or moving up or down along an angular axis—can be estimated using inertial sensor measurements from an accelerometer or other inertial sensor, or some of these movements can be estimated using a series of computed position estimates over time.

Many approaches for determining an activity context of a mobile device use an application programming interface (API) of the mobile device to acquire information from one or more features of the mobile device, and then evaluate the acquired information to determine a context. Acquired information can be used to identify locations of a mobile device, movement or non-movement of the mobile device, operating conditions of the mobile device, and other aspects of a mobile device. Examples of acquired information may include: information from the mobile device's positioning chip specifying an estimated position of the mobile device; information from the mobile device's inertial sensors specifying movement and orientation of the mobile device; information from the mobile device's camera specifying images captured by the camera; information from the mobile device's microphone specifying sounds captured by the camera; information from the mobile device's battery status specifying whether the mobile device is charging; or other information from other features of the mobile device. Additionally, pressure measurements from pressure sensors of mobile devices can be used to provide additional certainty as to the accuracy of determined contexts compared to approaches that do not consider measurements of pressure. By way of example, measurements of pressure can be used to confirm a previously-determined context, to decrease the likelihood of a previously-determined context, to indicate no adjustment to the likelihood of a context being true, or to identify another possible context. The determination of an activity context of a mobile device is described in U.S. Pat. No. 11,064,320, issued on Jul. 27, 2021, and entitled "Systems and Methods for Using a Pressure Sensor of a Mobile Device to Improve the Reliability of Determined Contexts," which is owned by the present assignee and is hereby incorporated by reference in its entirety.

In this example, a problematic 2D position of a mobile device can be determined using activity context information provided by the mobile device only (as shown in Table 1), or using accelerometer readings (e.g., measured using an inertial sensor or accelerometer of the mobile device) along with activity context that is provided by the mobile device (as shown in Table 2). The reported 2D position information, accelerometer readings and activity context from the device should all be consistent with one another. For example, if a reported 2D position time series (e.g., including two or more reported 2D positions at different instants in time) indicates that the device (and/or user) is "still" in an outdoor location, meaning the reported latitude and longitude values have not been changing for a while, then the accelerometer and activity context should also show that the device (and/or user) is still. If one or more of the 2D information, accelerometer readings, and activity context is not consistent (e.g., among the information from the mobile device, and/or from difference sources) with one another, then the 2D information is possibly stale and/or problematic and/or incorrect, and may not be accurately reflecting the true position of the device (and/or user).

Table 1 shows different examples of a change in reported 2D position information of a mobile device, activity context, and a conclusion about the 2D position quality (i.e., if the 2D position quality is good (e.g., likely accurate) or problematic (e.g., likely stale, or incorrect)). The change in reported 2D position information of the mobile device can be determined using a reported 2D position time series including two or more reported 2D positions at different instants in time, or using a sensor (e.g., an accelerometer) of the mobile device.

TABLE 1

Conclusion of 2D Position based on Change in Reported 2D Position (e.g., latitude and longitude) and Activity Context

| Change in Reported 2D Position | Activity Context | Conclusion of 2D Position quality |
|---|---|---|
| No change in a while | Still | Good |
| No change in a while | Walking, Driving, Biking, etc. | Problematic |
| Change | Still | Problematic |
| Change | Walking, Driving, Biking, etc. | Good |

Table 2 shows different examples of a change in reported 2D position information of a mobile device, accelerometer readings (from a sensor of the mobile device), and activity context, and a conclusion about the 2D position quality (i.e., if the 2D position quality is good (e.g., likely accurate) or problematic (e.g., likely stale, or incorrect)). The change in reported 2D position information of the mobile device can be determined using a reported 2D position time series including two or more reported 2D positions at different instants in time, or using a sensor (e.g., an accelerometer) of the mobile device. There are more possible combinations of information when using both accelerometer readings and activity context. The information between accelerometer reading and activity context should be consistent with each other. If they are not consistent with each other, then the quality of the 2D position may be inconclusive (using this method). In some cases, an accelerometer reading can be the square root of the sum of squares of accelerations measured (by the device) in three orthogonal directions (e.g., using three orthogonal accelerometers, or an accelerometer configured to measure acceleration in three orthogonal directions).

TABLE 2

Conclusion of 2D Position based on Change in Reported 2D Position (e.g., latitude and longitude), Accelerometer Reading, and Activity Context

| Change in Reported 2D Position | Accelerometer reading | Activity Context | Conclusion of 2D Position quality |
|---|---|---|---|
| No change in a while | 0 or very small value | Still | Good |
| No change in a while | Large value | Still | Inconclusive |
| No change in a while | 0 or very small value | Not still (Walking, Driving, Biking, etc.) | Inconclusive |
| No change in a while | Large value | Not still (Walking, Driving, Biking, etc.) | Problematic |
| Change | 0 or very small value | Still | Problematic |
| Change | Large value | Still | Inconclusive |
| Change | 0 or very small value | Not still (Walking, Driving, Biking, etc.) | Inconclusive |
| Change | Large value | Walking, Driving, Biking, etc. | Good |

Determining a Problematic 2D Position of a Mobile Device Using Consistency of Information from the Mobile Device In some cases, a problematic 2D position of a mobile device can be determined using the consistency of reported 2D position information over time.

The speed of a mobile device (or the speed of a user of a mobile device) can be estimated from changes in the reported 2D position of the device over time. For example, the average moving speed of the device can be derived using the distance and the time interval between two reported 2D position data points, for example, where the device is at a point A at time 0 and at a point B at time 1. If the derived average speed indicates that the device (and/or user) is moving from point A to point B with an unrealistically fast speed (e.g., over 80 mph in urban area), or with an impossible speed via any common mode of ground transportation (e.g., greater than 150 mph, or greater than 400 mph, or greater than 1000 mph), then the system can determine that the 2D position information from the device is likely stale and/or problematic and/or incorrect.

Figure 8:
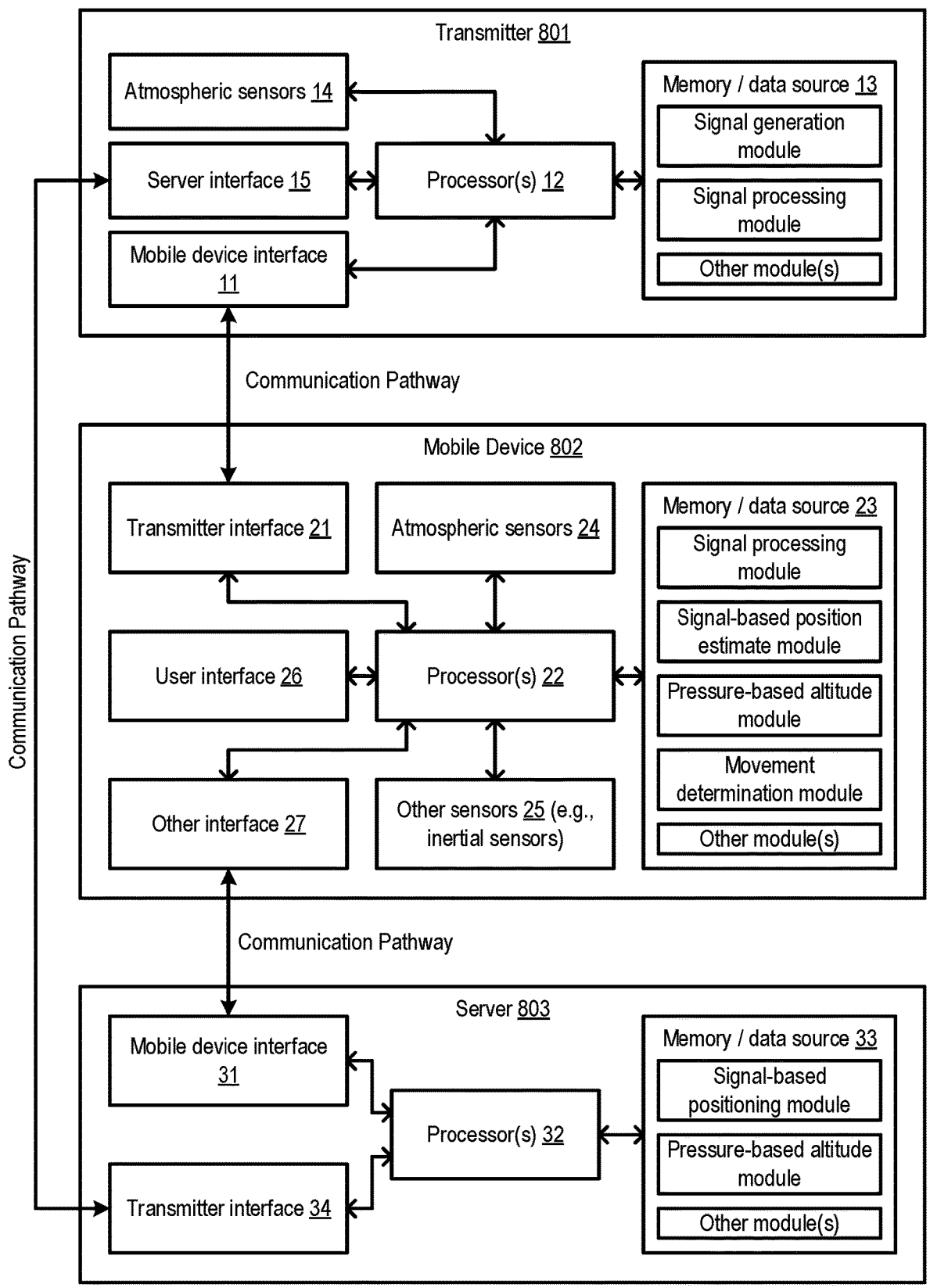
FIG. 8 illustrates components of a transmitter, a mobile device, and a server that can be used to perform the methods described herein, in accordance with some embodiments.

In some cases, a database can be accessed by the mobile device (e.g., by communicating with a server that stores the database, as described herein with respect to FIG. 8) that indicates the type of environment in which the mobile device is located. For example, information from the database can be used to determine that the reported 2D positions are within an urban area, a suburban or residential area, a rural area, a desert area, or in a different type of geographical area. The calculated average speed of the device over the time interval can be compared with a threshold speed (e.g., greater than or equal to 80 mph, greater than or equal to 150 mph, greater than or equal to 400 mph, or greater than or equal to 1000 mph) that can be related to a maximum speed of the area in which the device is located, and if there is an inconsistency, then the system can determine that the reported 2D position information may be stale and/or problematic and/or incorrect.

Figure 2:
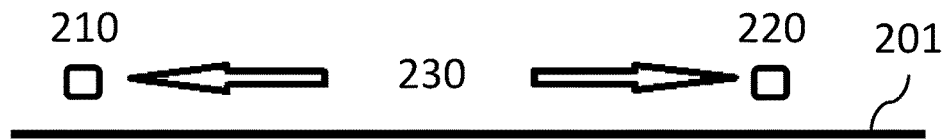
FIG. 2 shows a simplified schematic of an example of a mobile device over a terrain, in accordance with some embodiments.

FIG. 2 shows a simplified schematic of an example of a mobile device over a terrain 201. In this example, the distance and the time interval between two reported 2D position data points is used to derive an average speed of the device, which in turn is used to determine if a reported 2D position may be stale and/or problematic and/or incorrect. In the case shown in FIG. 2, a mobile device has a reported 2D position 210 with coordinates (X0,Y0) at a time 0, and the same device has a reported 2D position 220 with coordinates (X1,Y1) at a time 1. In an example, the mobile device is determined to be in an urban area (e.g., using a database and the reported 2D position information), and the coordinates (X0,Y0) at time 0 are 55 m away from coordinates (X1,Y1) at time 1, and time 1 is 1 second later than time 0. Therefore, according to the reported position information in this example, the mobile device (and user) has moved a distance of 55 meters in 1 second, which equates to an average speed between time 0 and time 1 of greater than 123 mph. That average speed is too fast for a normal use case in an urban area, so the system can determine that the 2D position information at time 0 and/or time 1 may be stale and/or problematic and/or incorrect. Therefore, in this case, the system can determine that the reported 2D location (X1,Y1) at time 1 may be stale, problematic, and/or incorrect.

In some cases, a maximum speed, a likely speed, or a speed limit, can be determined (e.g., using a database (or a map) that has urban clutter information or roads with speed information annotated) and be used to determine unrealistic and/or impossible speed thresholds in a particular area or region.

In some cases, the moving speed (determined from a time series of reported 2D positions) can be compared with other available information, such as activity context (e.g., derived from accelerometers of the mobile device), the status and raw readings from other sensors of the mobile device (e.g., an accelerometer), or a measurement of speed from an external sensor (e.g., the speedometer on a car, or Doppler measurements from a speed measuring device). In such cases, if the moving speed information is not consistent with the other available information then the system can determine that the 2D position information may be stale and/or problematic and/or incorrect.

Determining a Problematic 2D Position of a Mobile Device Using Another Database

In some cases, a problematic 2D position of a mobile device can be determined using a known building height.

In this example, 2D position information from a mobile device indicates that the mobile device (or the user of the mobile device) is inside a building. In some cases, a database can be accessed by the mobile device (e.g., by communicating with a server that stores the database, as described herein with respect to FIG. 8) that, based on the reported 2D position information, indicates a building in which the device is located. In cases where the mobile device is determined to be within a building, the altitude of the device should be roughly bounded by the ground (or the levels of the building that are below ground) and the building height. Altitude information from the device can be compared with the bounds of the altitude that are determined from the height of the building. The altitude information from the device can be measured by an altimeter of the device, a calibrated altimeter of the device, or another calibrated or uncalibrated altitude sensor (or pressure sensor) of the device. Such measurements of altitude typically also have some degree of uncertainty. If the altitude information from the device (including the measurement uncertainty) shows the vertical position (or altitude) of the device is outside the upper or lower boundary of the building, then the system can determine that the 2D position information may be stale and/or problematic and/or incorrect. In this case, it can be determined that the mobile device (and/or user) is likely not inside that particular building.

Figure 3A:
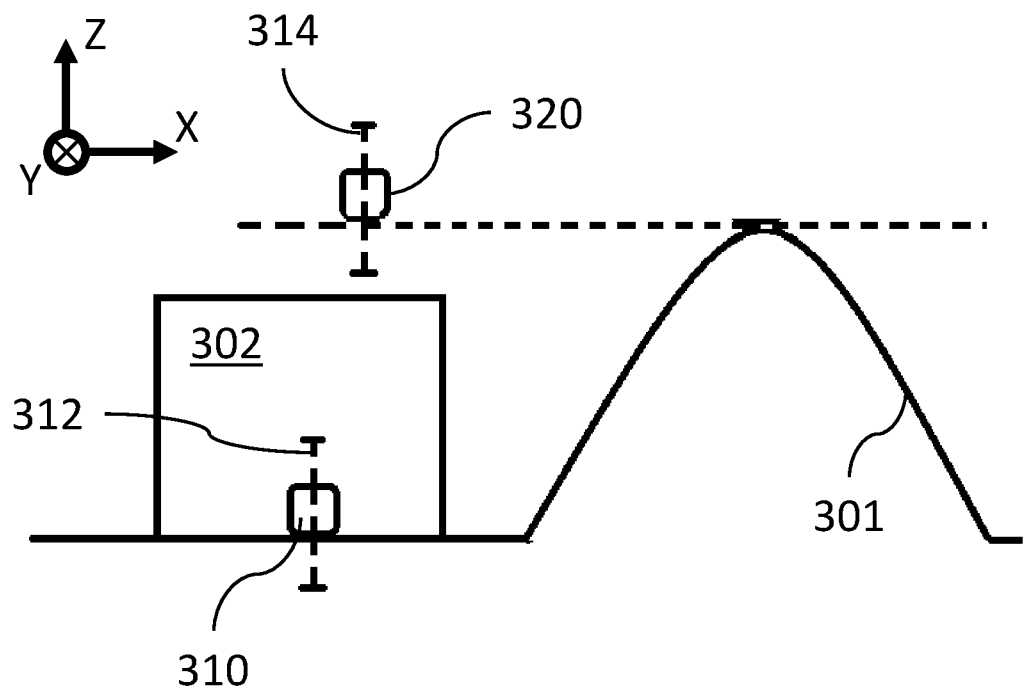
FIGS. 3A and 3B show simplified schematics of an example of a mobile device within a terrain and a building, in accordance with some embodiments.
Figure 3B:
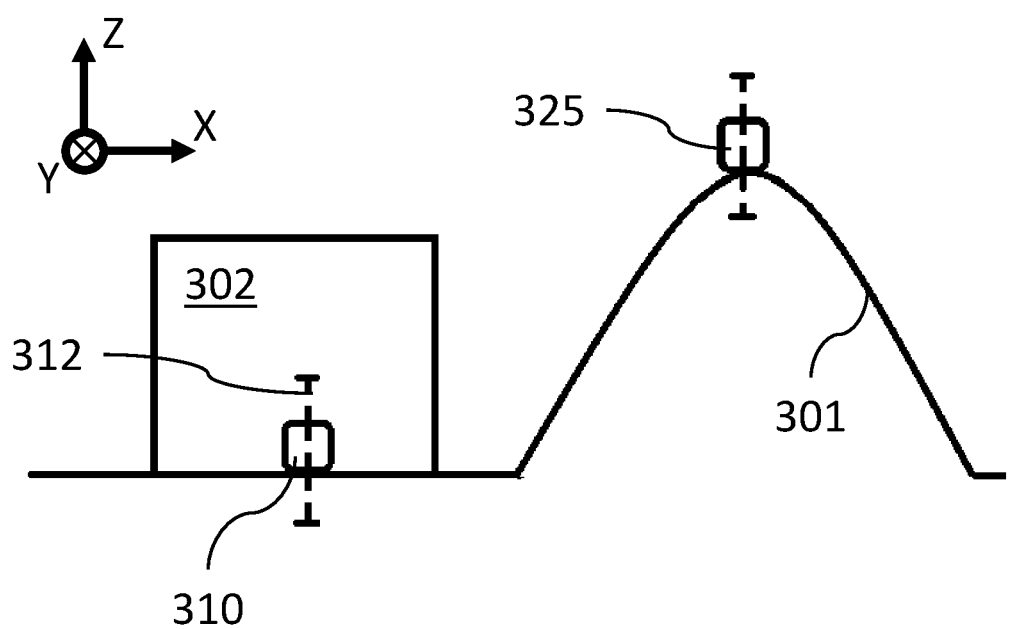

FIGS. 3A and 3B show simplified schematics of an example of a mobile device within a terrain 301 and a building 302. In this example, a measurement of altitude (e.g., using a sensor of the device) in conjunction with a determination that the device is within a building is used to determine if a reported 2D position may be stale and/or problematic and/or incorrect. FIG. 3A shows a reported position 310 of a mobile device at a first instant in time (time 0) and a reported position 320 of the same mobile device at a second instant in time (time 1). At time 0, the device reports that is has a 2D position with coordinates (X0,Y0), and an altitude Z0 with uncertainty U0 312, and the coordinates of the reported position 310 are approximately (X0,Y0,Z0). The directions X, Y and Z are shown in FIGS. 3A and 3B, and direction Y points into the page. At time 1, the device reports that is has a 2D position with coordinates (X1,Y1) and an altitude Z1 with uncertainty U1 314, and the coordinates of the reported position 320 are approximately (X1,Y1,Z1). The altitude Z0 and Z1 can be determined using a measurement from a sensor (e.g., an altimeter or pressure sensor) of the mobile device. The altitude Z1 (including uncertainty U1 314) is beyond the upper building height limit. Since the 2D position indicates that the mobile device is within building 302 and the altitude (including uncertainty U1 314) is beyond the upper building height limit, the mobile device may not be inside building 302, and the reported 2D position information may be stale and/or problematic and/or incorrect. Therefore, in this case, the system can determine that the reported 2D location (X1,Y1) at time 1 may be stale, problematic, and/or incorrect.

FIG. 3B shows a possible actual (or true) position 325 of the mobile device at time 1. The actual 2D position 325 of the mobile device (and user) could be at an outdoor location with coordinates (X2,Y2) where the height of terrain 301 is higher than the upper building height limit, and is consistent with the measured altitude of the device at time 1. In other cases, the mobile device (and/or user) could be inside another building (not shown) at time 1 that has a higher upper building height limit (e.g., higher floors) than building 302.

In some cases, a problematic 2D position of a mobile device can be determined using one or more known building footprints.

In this example, the overlap between a reported 2D position circle and a building footprint (or shape outlines) can be compared. The center of a 2D position circle is a 2D position at a given time, and the radius of the 2D position circle is a 2D position uncertainty of the mobile device. In some cases, the mobile device will report a 2D position and a degree of 2D position uncertainty. The 2D position uncertainty can be impacted by factors such as the number of GNSS satellites the device is able to receive signals from (e.g., due to building interference in an urban area), or multipath effects (e.g., for position determination using GNSS or using a WAPS). In some cases, the mobile device reports a degree of 2D position uncertainty based on one of the factors above. The building footprint can be determined using a database that is accessed by the mobile device (e.g., by communicating with a server that stores the database, as described herein with respect to FIG. 8). In a case where it is known from other information (e.g., the activity context indicates that the user of the mobile device is driving, or that the mobile device is likely within a vehicle) that the mobile device (and/or user) is outside the building, and if there is significant overlap (above a threshold, e.g., overlap greater than 10%, or greater than 20%, or greater than 50%) between the 2D position circle and the building footprint, then the system can determine that the reported 2D position may be stale and/or problematic and/or incorrect.

Figure 4A:
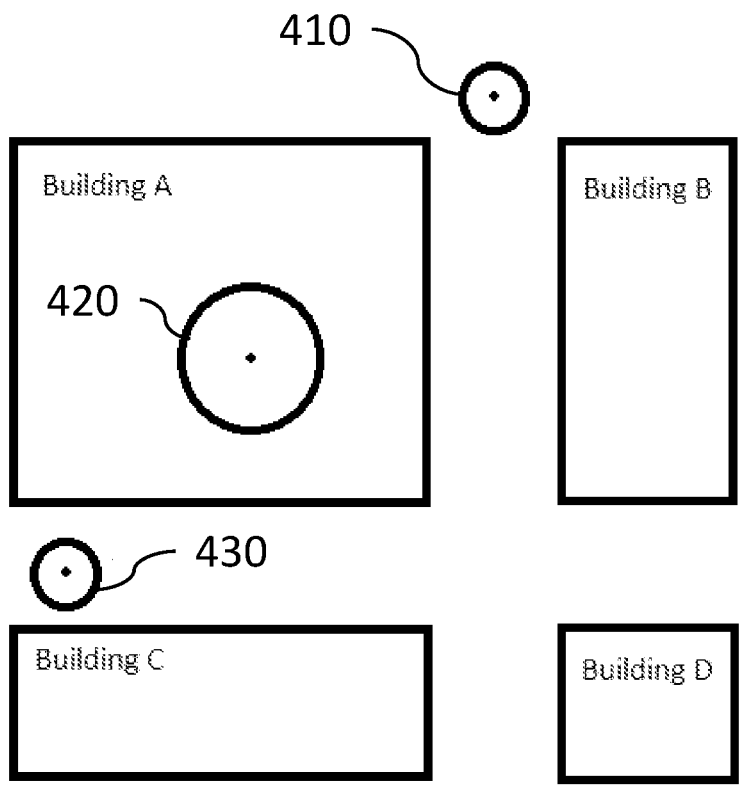
FIGS. 4A and 4B show simplified schematics of an example of a mobile device within buildings (e.g., in an urban or residential environment), in accordance with some embodiments.
Figure 4B:
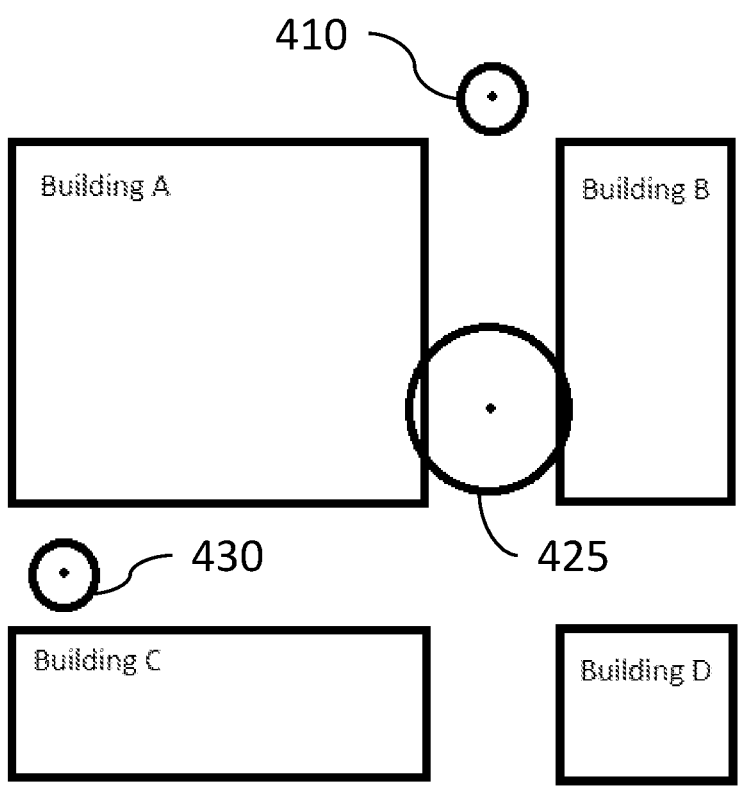

FIGS. 4A and 4B show simplified schematics of an example of a mobile device within buildings (e.g., in an urban or residential environment). In this example, an activity context of the mobile device in conjunction with one or more building footprints (or contours) is used to determine if a reported 2D position may be stale and/or problematic and/or incorrect. FIG. 4A shows a reported 2D position circle 410 of a mobile device at a time 0, a reported 2D position circle 420 of the same mobile device at a time 1 (that is after time 0), and a reported 2D position circle 430 of the same mobile device at a time 2 (that is after time 1). The mobile device is in the vicinity of 4 buildings ("Building A," "Building B," "Building C," and "Building D"). In this example, the mobile device is determined to be in a moving vehicle (e.g., from activity context, or a speed derived from the positions and times when moving from time 0 to time 1 and/or from time 1 to time 2). Since the mobile device is determined to be in a vehicle, it can be assumed that the mobile device (and/or user) is not entering any buildings. The reported 2D position circle 420 of the device at time 1 in FIG. 4A falls inside the footprint of Building A, and therefore may be stale and/or problematic and/or incorrect. Therefore, in this case, the system can determine that the reported 2D position circle 420 at time 1 may be stale, problematic, and/or incorrect. In some cases, an identification of a problematic 2D position in the past (e.g., at time 1 in the current example) is used in post-processing actions (or operations) by the mobile device, such as the calibration of one or more components (e.g., sensors, pressure sensors, altimeters, or accelerometers) of the device. In such cases, the problematic 2D positions can be flagged and excluded from use in the calibration or other operation (e.g., a determination of an estimate of the actual 2D position of the mobile device, or another operation). The actual position of the device at time 1 should be outside of all building contours (or footprints) and on the road (or has only a small overlap with the surrounding building contours (e.g., less than 10%). FIG. 4B shows a possible actual position circle 425 of the mobile device at time 1, which is outside of the building footprints and between the reported 2D positions at time 0 and time 2.

In some cases, a problematic reported 2D position of a mobile device can be the result of linear interpolation. For example, the 2D position circle 420 in FIG. 4A lies approximately along a straight line between reported 2D position circle 410 at time 0 and reported 2D position circle 430 at time 2. The 2D position uncertainty of the mobile device at time 1 is also greater than that at time 0 and time 2. In some cases, missing 2D position data can be determined using a linear interpolation between two acquired 2D position data points. However, the case illustrated in FIGS. 4A and 4B shows that such linear interpolation can cause the system to report stale and/or problematic and/or incorrect 2D positions, and (since the mobile device is determined to be in a vehicle) the more likely position of the mobile device at time 1 is shown as 2D position circle 425 in FIG. 4B. In some cases of this example, the system can determine that a reported 2D position is stale and/or problematic and/or incorrect, and the reported 2D position is removed (or filtered, or deleted, or discarded) from a list of reported 2D positions. In some cases of this example, upon determining that a 2D position of the mobile device is stale and/or problematic and/or incorrect, the system can flag (or mark) the 2D position, for example, to be excluded from use in other operations (e.g., a determination of an estimate of the actual 2D position of the mobile device, a calibration of a component of the mobile device, or another operation).

In some cases, a problematic 2D position of a mobile device can be determined using the height of terrain in the vicinity of the device.

The height of terrain in the vicinity of a mobile device can be determined using a database that is accessed by the mobile device (e.g., by communicating with a server that stores the database, as described herein with respect to FIG. 8). In this example, the mobile device is determined to be outdoors (i.e., not inside a building) and the height of terrain is compared with an altitude reported by device (e.g., measured using an altimeter or pressure sensor of the mobile device). The altitude reported by the device should correlate with the height of the terrain at the actual 2D location of the mobile device. The height of the terrain at a 2D position can be looked up using a database, in some cases. If the device reports an altitude that is different than the terrain height of the device at the reported 2D location (beyond a threshold, e.g., more than 1 m, or more than 2 m, or more than 3 m, or beyond a threshold where the threshold is greater than 1 m, or greater than 2 m, or greater than 3 m), then the system can determine that the reported 2D location provided by the device may be stale, problematic or incorrect. In contrast, if the device reports an altitude that is the same as the terrain height of the device at the reported 2D location (within a threshold, e.g., less than 1 m, or less than 2 m, or less than 3 m, or within a threshold where the threshold is greater than 1 m, or greater than 2 m, or greater than 3 m), then the reported 2D location provided by the device may be correct.

Figure 5A:
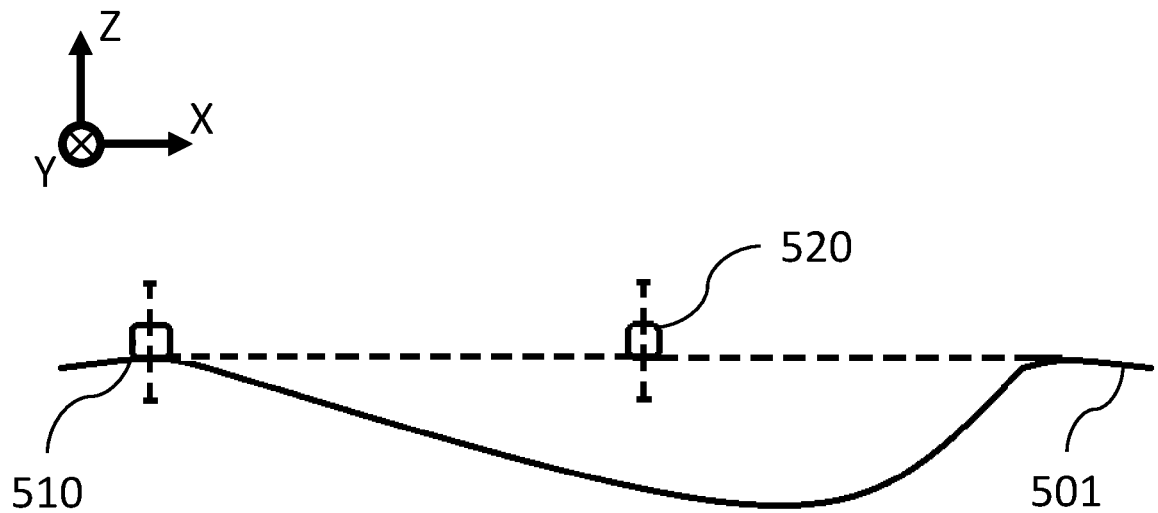
FIGS. 5A and 5B show simplified schematics of an example of a mobile device at different positions at different times over a terrain, in accordance with some embodiments.
Figure 5B:
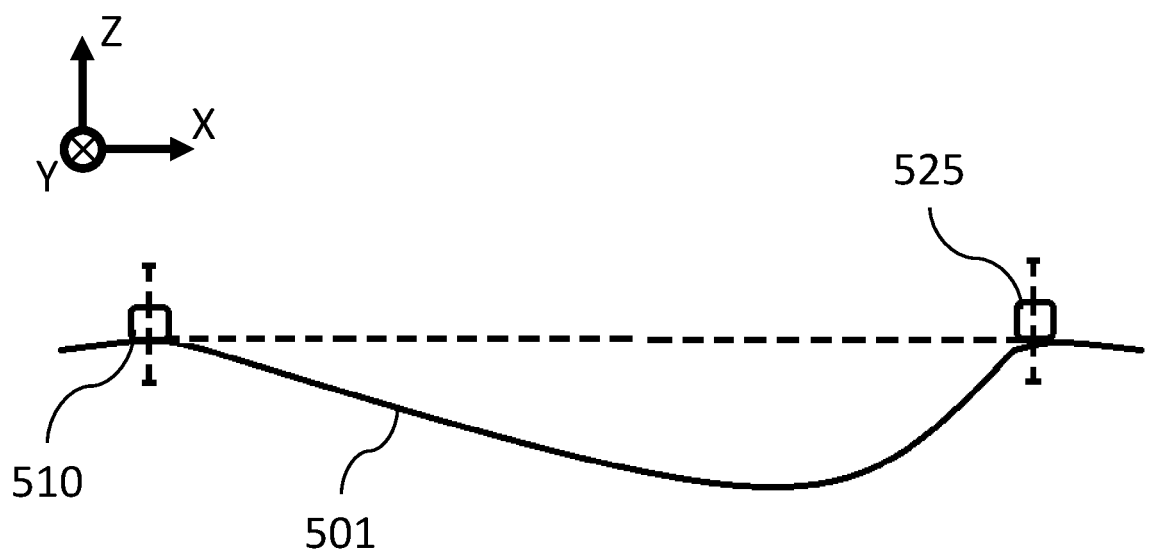

FIGS. 5A and 5B show simplified schematics of an example of a mobile device at different positions at different times over a terrain 501. In this example, the height of the terrain is used to determine if a reported 2D position may be stale and/or problematic and/or incorrect. FIG. 5A shows reported position 510 of a mobile device at a time 0 at a first outdoor location, and a reported position 520 of the same mobile device at a time 1 at a second outdoor location. At both time 0 and time 1, a measured altitude of the device (e.g., measured using a calibrated or uncalibrated altimeter, or other altitude sensor of the device) is Z0. In other words, at time 0, the device reports that it has a 2D position with coordinates (X0,Y0) and a measured altitude of Z0, and the coordinates of the reported position 510 are (X0,Y0,Z0). At time 1, the device reports that it has a 2D position with coordinates (X1,Y1) and an altitude of Z0, and the coordinates of the reported position 520 are (X1,Y1,Z0). The directions X, Y and Z are shown in FIGS. 5A and 5B, and direction Y points into the page. In other examples, direction Y can point out of the page (or the X and Y directions can be switched). However, the height of the terrain at 2D position (X0,Y0) has a height TH0, and the height of the terrain at 2D position (X1,Y1) has a different height TH1 that is lower than TH0. For example, a calculated altitude (or height) can be determined by looking up the terrain height at the reported 2D positions using a database to determine an estimate of a 3D position. The measured altitude and the calculated altitude (e.g., from the terrain height at the reported 2D positions and a database) can be compared to see if the difference exceeds a threshold, which can indicate that the reported 2D position may be stale and/or problematic and/or incorrect. In the example shown in FIG. 5A, by comparing the measured altitude and the calculated altitude (or terrain height at 2D position (X1,Y1)), the system can determine that the reported 2D location (X1,Y1) at time 1 may be stale and/or problematic and/or incorrect, since it is unlikely (or in some cases unphysical) that the mobile device (and/or user) would be floating in the air above the terrain.

FIG. 5B shows a possible actual position 525 of the mobile device at time 1 (with 2D position coordinates (X2,Y2)), which has a height of terrain approximately equal to TH0. The actual position 525, may be consistent with the actual 2D position of the mobile device at time 1 because the height of the terrain at reported position 520 is consistent with (or, is within a threshold of difference from) the measured altitude of the mobile device at time 1. In some cases of the above method, the system can determine that the reported 2D position is stale and/or problematic and/or incorrect, and the reported 2D position is removed (or filtered, or deleted, or discarded) from a list of reported 2D positions. In some cases of the above method, upon determining that a 2D position of the mobile device is stale and/or problematic and/or incorrect, the system can flag (or mark) the 2D position, for example, to be excluded from use in other operations (e.g., a determination of an estimate of the actual 2D position of the mobile device, a calibration of a component of the mobile device, or another operation). In some cases of the above method, upon determining that the reported 2D position is problematic, the system could trigger the acquisition and reporting of an updated 2D position of the mobile device.

The above method can be performed by a device with a calibrated or an uncalibrated altitude (and/or pressure) sensor. In the case of a device with an uncalibrated altitude (and/or pressure) sensor, the measured altitude may be incorrect, and may not be within about 1 m (or about 2 m, or about 3 m) of the altitude of the terrain at the 2D location of the device (in contrast to the example shown in FIGS. 5A and 5B). In such cases, the device can be measuring a relative altitude that represents the difference between a measured uncalibrated altitude of a device and a calculated altitude, for example, determined from the altitude of terrain at the location of the device (e.g., determined using a database). The relative altitude is therefore essentially the calibration value of the device altitude (and/or pressure) sensor. For a normally functioning sensor, the relative altitude (or calibration value) should be the same (or only vary within a small threshold, e.g., within about 1 m, or within about 10 Pa in the case of pressure sensors) over a time period (e.g., within an hour, or within a day). Therefore, the relative altitude of a device should be the same or should only vary within a small threshold (e.g., less than 1 m) over a time period (e.g., within an hour, or within a day), and the relative altitude can be used in methods similar to the method above.

Figure 6A:
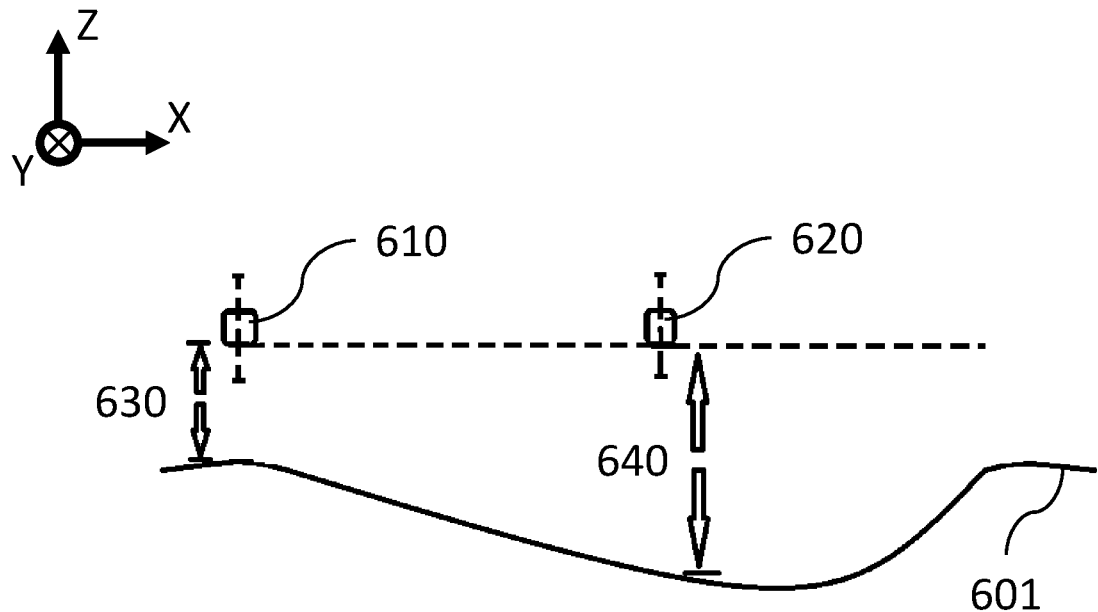
FIGS. 6A and 6B show simplified schematics of an example of a mobile device at different positions at different times over a terrain, in accordance with some embodiments.
Figure 6B:
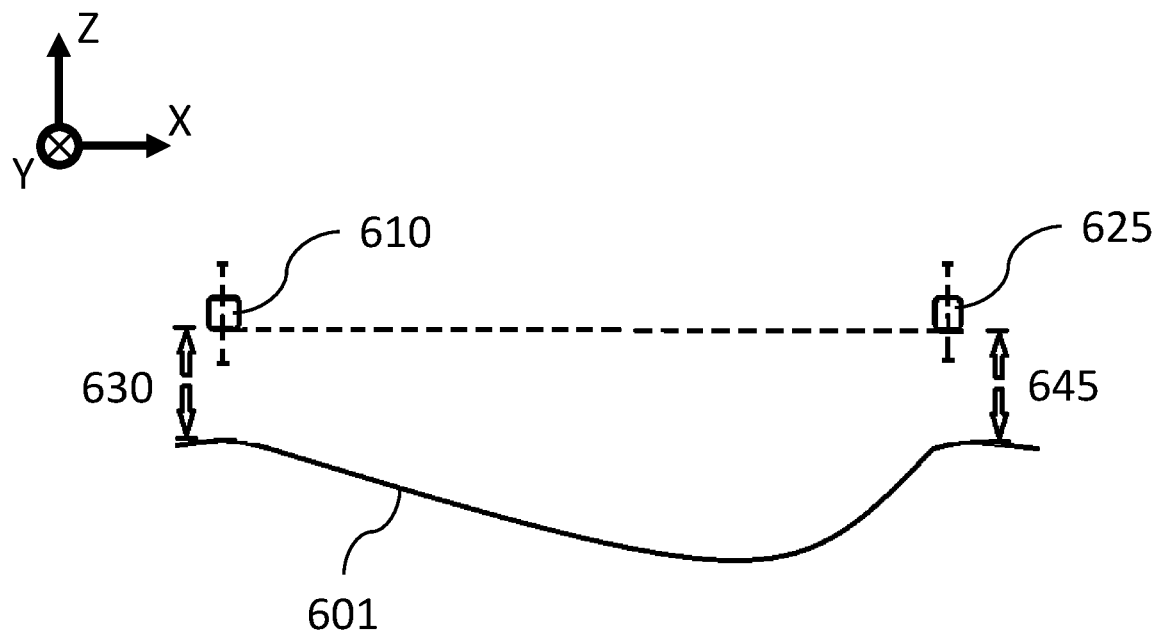

FIGS. 6A and 6B show simplified schematics of an example of a mobile device at different positions at different times over a terrain 601. In this example, the height of the terrain is used to determine if a reported 2D position may be stale and/or problematic and/or incorrect. FIG. 6A shows reported position 610 of a mobile device at a time 0 at an outdoor location, and a reported position 620 of the same mobile device at a time 1 at an outdoor location. At both time 0 and time 1, a reported relative altitude of the device (e.g., measured using an uncalibrated altimeter, an uncalibrated pressure sensors, or another type of uncalibrated altitude sensor of the device) is Z0. In other words, at time 0, the device reports that it has a 2D position with coordinates (X0,Y0) and an uncalibrated altitude of Z0, and the coordinates of the reported position 610 are (X0,Y0,Z0). At time 1, the device reports that it has a 2D position with coordinates (X1,Y1) and an uncalibrated altitude of Z0, and the coordinates of the reported position 620 are (X1,Y1,Z0). The directions X, Y and Z are shown in FIGS. 6A and 6B, and direction Y points into the page. However, the height of the terrain at 2D position (X0,Y0) has a height TH0, and the height of the terrain at 2D position (X1,Y1) has a height TH1. A relative altitude 630 can be determined at time 0 by comparing the uncalibrated altitude (Z0) at time 0 with the terrain height TH0, and relative altitude 640 can be determined at time 1 by comparing the uncalibrated altitude (Z0) at time 1 with the terrain height TH1. In this example, the relative altitude 630 at time 0 and the relative altitude 640 at time 1 are different by more than a threshold (e.g., by more than 1 m, or by more than 2 m, or by more than 3 m, or where the threshold is greater than 1 m, or greater than 2 m, or greater than 3 m). By comparing the relative altitude 630 at time 0 and the relative altitude 640 at time 1, the system can determine that the reported 2D location (X1,Y1) at time 1 may be stale and/or problematic and/or incorrect, since it is unlikely that the sensor of the mobile device has drifted by more than the threshold over the time period between time 0 and time 1.

FIG. 6B shows a possible actual position 625 of the mobile device at time 1 (with 2D position coordinates (X2,Y2)), which has a height of terrain approximately equal to TH0. The relative altitude 645 at time 1 is the same as the relative altitude 630 at time 0, within a threshold (e.g., within 1 m, or within 2 m, or within 3 m, or where the threshold is greater than 1 m, or greater than 2 m, or greater than 3 m). The possible actual position 625, may indicate the actual 2D position of the mobile device at time 1 because the relative altitude 645 of the mobile device at time 0 is consistent with (or, is within a threshold of difference from) the relative altitude 630 of the mobile device at time 0. In some cases of this example, the system can determine that a reported 2D position is stale and/or problematic and/or incorrect, and the reported 2D position is removed (or filtered, or deleted, or discarded) from a list of reported 2D positions. In some cases of this example, upon determining that a 2D position of the mobile device is stale and/or problematic and/or incorrect, the system can flag (or mark) the 2D position, for example, to be excluded from use in other operations (e.g., a determination of an estimate of the actual 2D position of the mobile device, a calibration of a component of the mobile device, or another operation). In some cases of this example, upon determining that the reported 2D position is problematic, the system could trigger the acquisition and reporting of an updated 2D position of the mobile device.

Figure 7A:
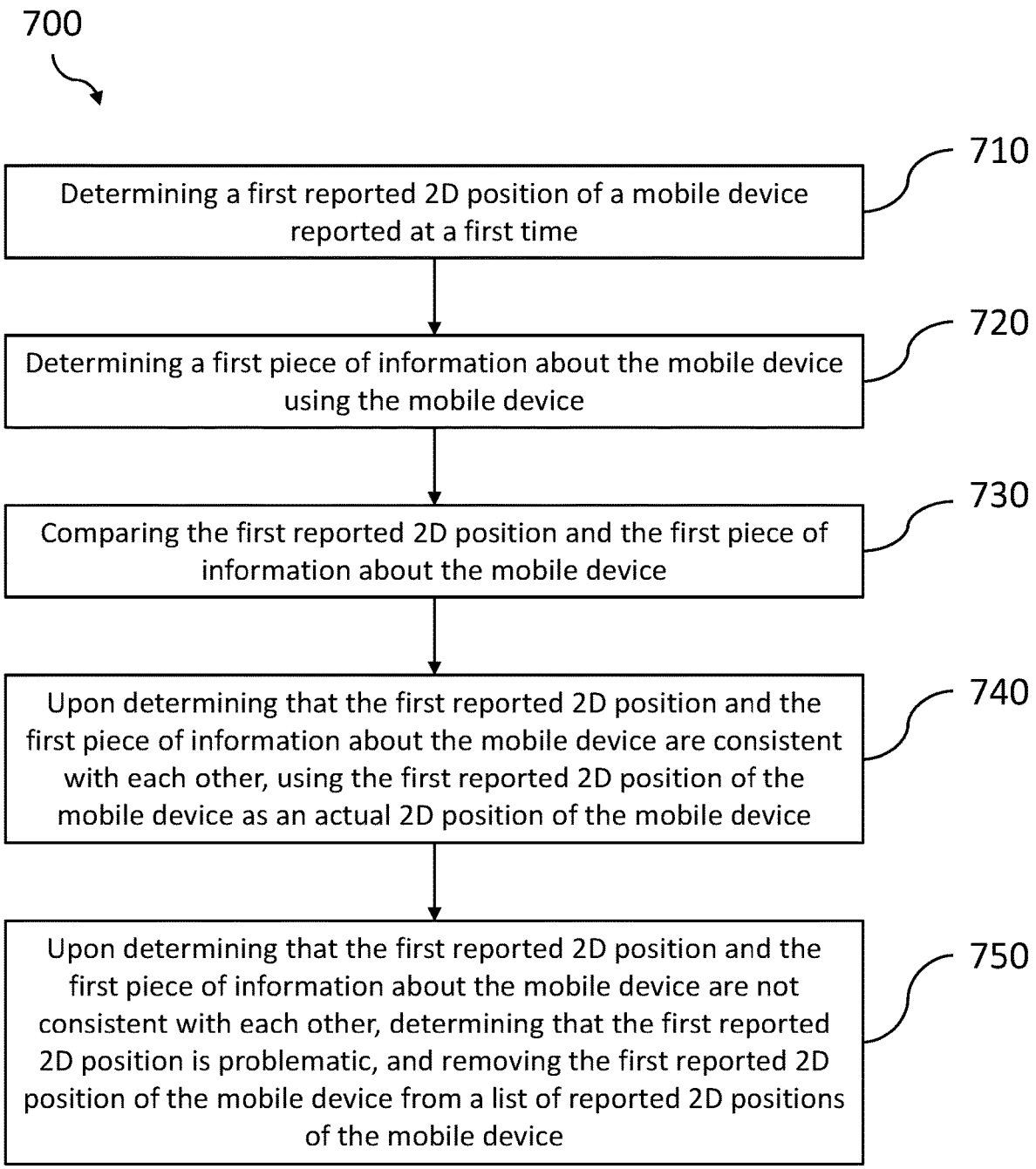
FIGS. 7A and 7B are flowcharts of example methods to identify a problematic 2D position of a mobile device, in accordance with some embodiments.

FIG. 7A is a flowchart of example method 700 to identify a problematic 2D position (i.e., 2D location) of a mobile device. In step 710, a first reported 2D position of a mobile device reported at a first time is determined. The first reported 2D position can be determined using a processor of the mobile device. For example, the processor of the mobile device can perform a location determination method, such as a method using a GNSS, a method using a WAPS, or another method. In step 720, a first piece of information about the mobile device is determined using a processor of the mobile device. For example, the processor can determine the first piece of information using a location determination method, by interfacing with a database, and/or using an output (or a signal from) a sensor of the mobile device. The sensor of the mobile device can be, for example, an altitude sensor, a pressure sensor, an accelerometer, or another sensor of the device. In step 730, the first reported 2D position and the first piece of information about the mobile device are compared. The first reported 2D position and the first piece of information about the mobile device can be compared using the processor of the mobile device. For example, the first piece of information can be a measured altitude, obtained using a sensor of the mobile device, and the processor of the mobile device can determine a calculated altitude of the mobile device based on the first reported 2D position of the mobile device (e.g., by referencing a database). Then the processor of the mobile device can compare the measured and calculated altitudes in step 730. In step 740, upon determining that the first reported 2D position and the first piece of information about the mobile device are consistent with each other, the first reported 2D position of the mobile device is used, by the processor of the mobile device, as an estimate of the actual 2D position of the mobile device. In step 750, upon determining that the first reported 2D position and the first piece of information about the mobile device are not consistent with each other, the first reported 2D position is determined to be problematic, and the first reported 2D position of the mobile device is removed (or filtered, or deleted, or discarded), using the processor of the mobile device, from a list of reported 2D positions of the mobile device.

Figure 7B:
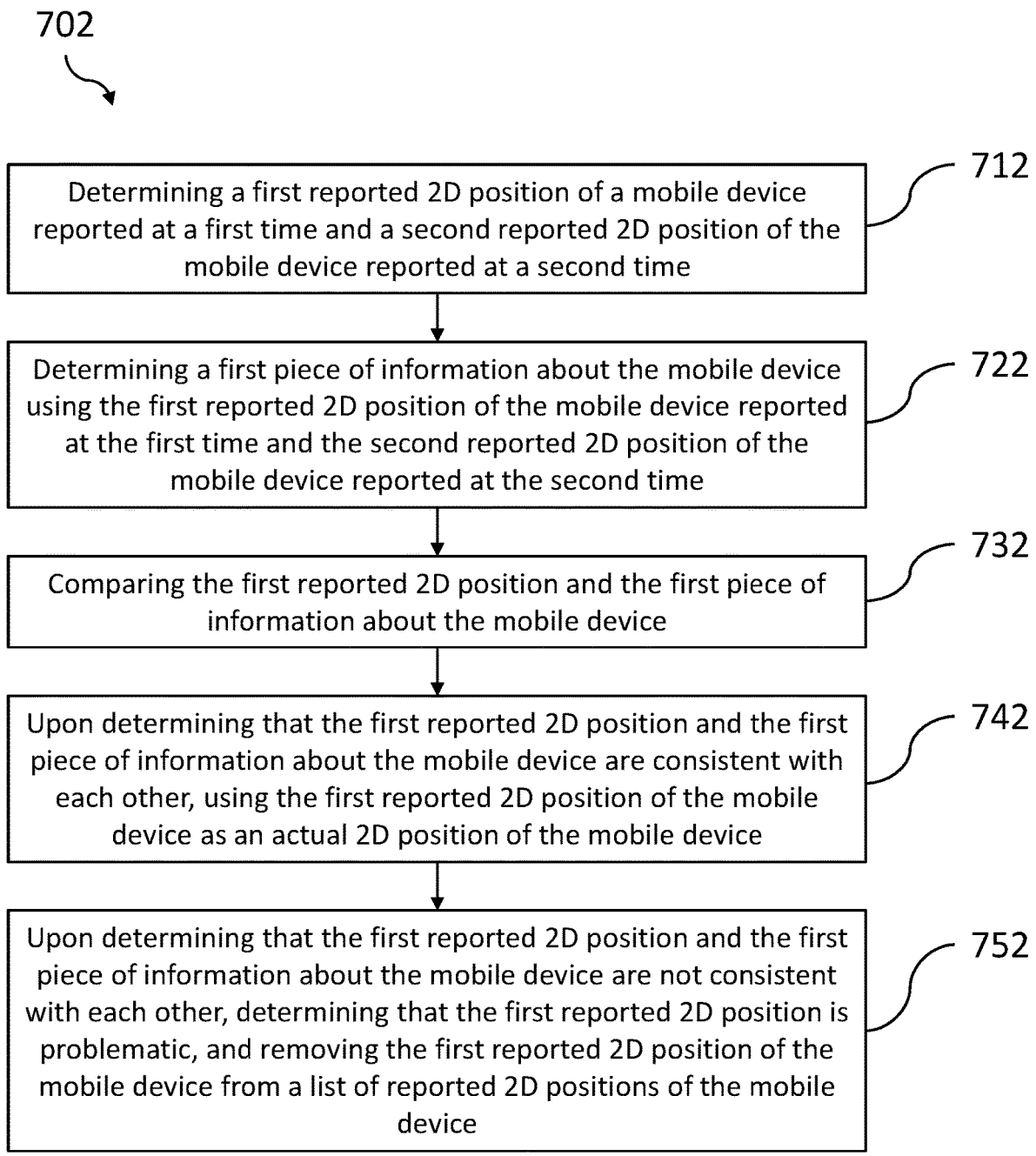

FIG. 7B is a flowchart of example method 702 to identify a problematic 2D position (i.e., 2D location) of a mobile device. In step 712, a first reported 2D position of a mobile device reported at a first time and a second reported 2D position of the mobile device reported at a second time are determined. The first and second reported 2D positions can be determined using a processor of the mobile device. In some cases, the first and/or second reported 2D positions can be determined by user intervention, for example, where a user manually drops a pin on a map or enters coordinates of a 2D position. For example, the processor of the mobile device can perform a location determination method, such as a method using a GNSS, a method using a WAPS, or another method. In step 722, a first piece of information about the mobile device is determined using the first reported 2D position of the mobile device reported at the first time and the second reported 2D position of the mobile device reported at the second time. The determining of the first piece of information in this example can be performed using a processor of the mobile device. For example, the first piece of information can be a speed of the mobile device, an activity context of the mobile device, an area in which the mobile device is located, or another type of information described herein, and the processor of the mobile device can use the first and second reported 2D positions to determine the first piece of information. In step 732, the first reported 2D position and the first piece of information about the mobile device are compared. The first reported 2D position and the first piece of information about the mobile device can be compared using a processor of the mobile device. In step 742, upon determining that the first reported 2D position and the first piece of information about the mobile device are consistent with each other, the first reported 2D position of the mobile device is used, by the processor of the mobile device, as an estimate of the actual 2D position of the mobile device. In step 752, upon determining that the first reported 2D position and the first piece of information about the mobile device are not consistent with each other, the first reported 2D position is determined to be problematic, and the first reported 2D position of the mobile device is removed (or filtered, or deleted, or discarded), using the processor of the mobile device, from a list of reported 2D positions of the mobile device.

In the methods to identify a problematic 2D position of a mobile device described herein, for example in methods 700 and 702, any steps described as being performed by a processor of the mobile device can, in some embodiments, be performed in part, or entirely, at a remote server or servers. For example, one or more pieces of information about the mobile device can be determined (e.g., in step 720 of method 700, or in step 722 of method 702) using a processor of the mobile device, or in part, or entirely, using a remote server or servers. In another example, a first reported 2D position and one or more pieces of information about the mobile device can be compared (e.g., in step 730 of method 700, or in step 732 of method 702) using a processor of the mobile device, or in part, or entirely, using a remote server or servers. Similarly, a reported 2D position of the mobile device can be used as an estimate of the actual 2D position of the mobile device, or can be removed (or filtered, or deleted, or discarded) from a list of reported 2D positions of the mobile device (e.g., in steps 740 or 750 of method 700, or in steps 742 or 752 of method 702) using a processor of the mobile device, or in part, or entirely, using a remote server or servers. The components of a transmitter, a mobile device, and a server, including the processors of the mobile device and the server will now be described.

FIG. 8 illustrates components of a transmitter 801, a mobile device 802, and a server 803 that can be used to perform the methods described herein. Examples of communication pathways are shown by arrows between components.

By way of example in FIG. 8, each of the transmitters 801 may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter 801; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter 801; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter 801; the position of the transmitter 801; environmental conditions at or near the transmitter 801; and/or other information known in the art. The atmospheric sensor(s) 14 may be integral with the transmitter 801, or separate from the transmitter 801 and either co-located with the transmitter 801 or located in the vicinity of the transmitter 801 (e.g., within a threshold amount of distance).

By way of example FIG. 8, the mobile device 802 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device 802; other sensor(s) 25 for measuring other conditions (e.g., inertial sensors, such as an accelerometer, for measuring movement and orientation, gyroscopes, and GNSS sensors (i.e., GNSS antennas and related processing modules)); a user interface 26 (e.g., display, keyboard, microphone, speaker, other) for permitting a user to provide inputs and receive outputs; another interface 27 for exchanging information with the server or other devices external to the mobile device 802 (e.g., an antenna, a network interface, or other); and any other components known to one of ordinary skill in the art. A GNSS interface and processing unit (which is an other sensor 25) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device 802; (ii) estimation of an altitude of the mobile device 802 based on measurements of pressure from the mobile device 802 and transmitter(s), temperature measurement(s) from the transmitter(s) or another source, and any other information needed for the computation); (iii) processing of received signals to determine position information (e.g., times of arrival or travel time of the signals, pseudo-ranges between the mobile device 802 and transmitters, transmitter atmospheric conditions, transmitter and/or locations or other transmitter information); (iv) use of position information to compute an estimated position of the mobile device 802; (v) determination of movement based on measurements from inertial sensors of the mobile device 802; (vi) GNSS signal processing; or (vii) other processing as required by operations described in this disclosure.

By way of example FIG. 8, the server 803 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server 803; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

The invention claimed is:

1. A method comprising:
   determining, using a processor of a mobile device, a first reported 2D position of the mobile device reported at a first time;
   determining, using the processor of the mobile device, a first piece of information about the mobile device;
   determining, using the processor of the mobile device, an earlier reported 2D position of the mobile device reported at an earlier time, wherein the earlier time occurs before the first time;
   determining, using the processor of the mobile device, a later reported 2D position of the mobile device reported at a later time, wherein the later time occurs after the first time;
   determining, using the processor of the mobile device, an earlier piece of information about the mobile device using the earlier reported 2D position of the mobile device reported at the earlier time and a database comprising building footprints, wherein the earlier piece of information about the mobile device is that the earlier reported 2D position is outside of a building footprint of the building footprints in the database;
   determining, using the processor of the mobile device, the first piece of information about the mobile device using the first reported 2D position of the mobile device reported at the first time and the database, wherein the first piece of information about the mobile device is that the first reported 2D position is inside of a building footprint of the building footprints in the database;

determining, using the processor of the mobile device, a later piece of information about the mobile device using the later reported 2D position of the mobile device reported at the later time and the database, wherein the later piece of information about the mobile device is that the later reported 2D position is outside of a building footprint of the building footprints in the database;

comparing, using the processor of the mobile device, the first reported 2D position and the first piece of information about the mobile device; and upon determining that the first reported 2D position and the first piece of information about the mobile device are consistent with each other, using the first reported 2D position of the mobile device, by the processor of the mobile device, as an estimate of an actual 2D position of the mobile device, or upon determining that the first reported 2D position and the first piece of information about the mobile device are not consistent with each other, determining, using the processor of the mobile device, that the first reported 2D position is problematic, and removing, using the processor of the mobile device, the first reported 2D position of the mobile device from a list of reported 2D positions of the mobile device;

wherein the determining that the first reported 2D position and the first piece of information about the mobile device are not consistent with each other, the determining that the first reported 2D position is problematic, and the removing the first reported 2D position of the mobile device from a list of reported 2D positions of the mobile device, are based on the earlier, first, and later pieces of information.

2. The method of claim 1, wherein determining the first reported 2D position of the mobile device reported at the first time comprises determining the first reported 2D position of the mobile device using the processor of the mobile device to perform a location determination method.

3. The method of claim 1, further comprising:
determining an activity context of the mobile device at the first time using the processor of the mobile device and an accelerometer of the mobile device; and
wherein the determining that the first reported 2D position and the first piece of information about the mobile device are not consistent with each other is based on the earlier, first, and later pieces of information, and on the activity context.

4. The method of claim 1, further comprising:
determining an activity context of the mobile device at the later time using the processor of the mobile device and an accelerometer of the mobile device; and
wherein the determining that the first reported 2D position and the first piece of information about the mobile device are not consistent with each other is based on the earlier, first, and later pieces of information, and on the activity context.

5. The method of claim 1, further comprising:
determining that the first reported 2D position and the first piece of information about the mobile device are not consistent with each other based on the earlier, first, and later pieces of information; and
excluding the first reported 2D position from use in a calibration of one or more components of the mobile device.

6. The method of claim 5, wherein the one or more components of the mobile device are one or more sensors.

7. The method of claim 5, wherein the one or more components of the mobile device are one or more of a pressure sensor, an altimeter, and an accelerometer.

8. The method of claim 1, further comprising:
determining that the first reported 2D position and the first piece of information about the mobile device are not consistent with each other based on the earlier, first, and later pieces of information; and
removing, filtering, deleting, or discarding the first reported 2D position from a list of reported 2D positions.

9. The method of claim 1, further comprising determining an earlier position uncertainty for the earlier time, a first position uncertainty for the first time, and a later position uncertainty for the later time.

10. The method of claim 9, wherein the first position uncertainty is greater than the earlier position uncertainty, and wherein the first position uncertainty is greater than the later position uncertainty.

11. The method of claim 9, wherein the earlier, first and later position uncertainties are determined based on a number of global navigation satellite system (GNSS) satellites that the mobile device is able to receive signals from at the respective earlier, first and later times.

12. The method of claim 9, wherein the earlier, first and later position uncertainties are determined based on identified multipath effects for position determination using a global navigation satellite system (GNSS) or using a wide area positioning system (WAPS).

13. The method of claim 1, further comprising:
determining an activity context of the mobile device at the first time using the processor of the mobile device; and
wherein the determining that the first reported 2D position and the first piece of information about the mobile device are not consistent with each other is based on the earlier, first, and later pieces of information, and on the activity context.

14. The method of claim 1, further comprising:
determining an activity context of the mobile device at the later time using the processor of the mobile device; and
wherein the determining that the first reported 2D position and the first piece of information about the mobile device are not consistent with each other is based on the earlier, first, and later pieces of information, and on the activity context.

* * * * *